June 30, 1953 — J. A. WEEDMAN — 2,643,972
CONTINUOUS ADSORPTION-DESORPTION PROCESS
Filed April 2, 1951
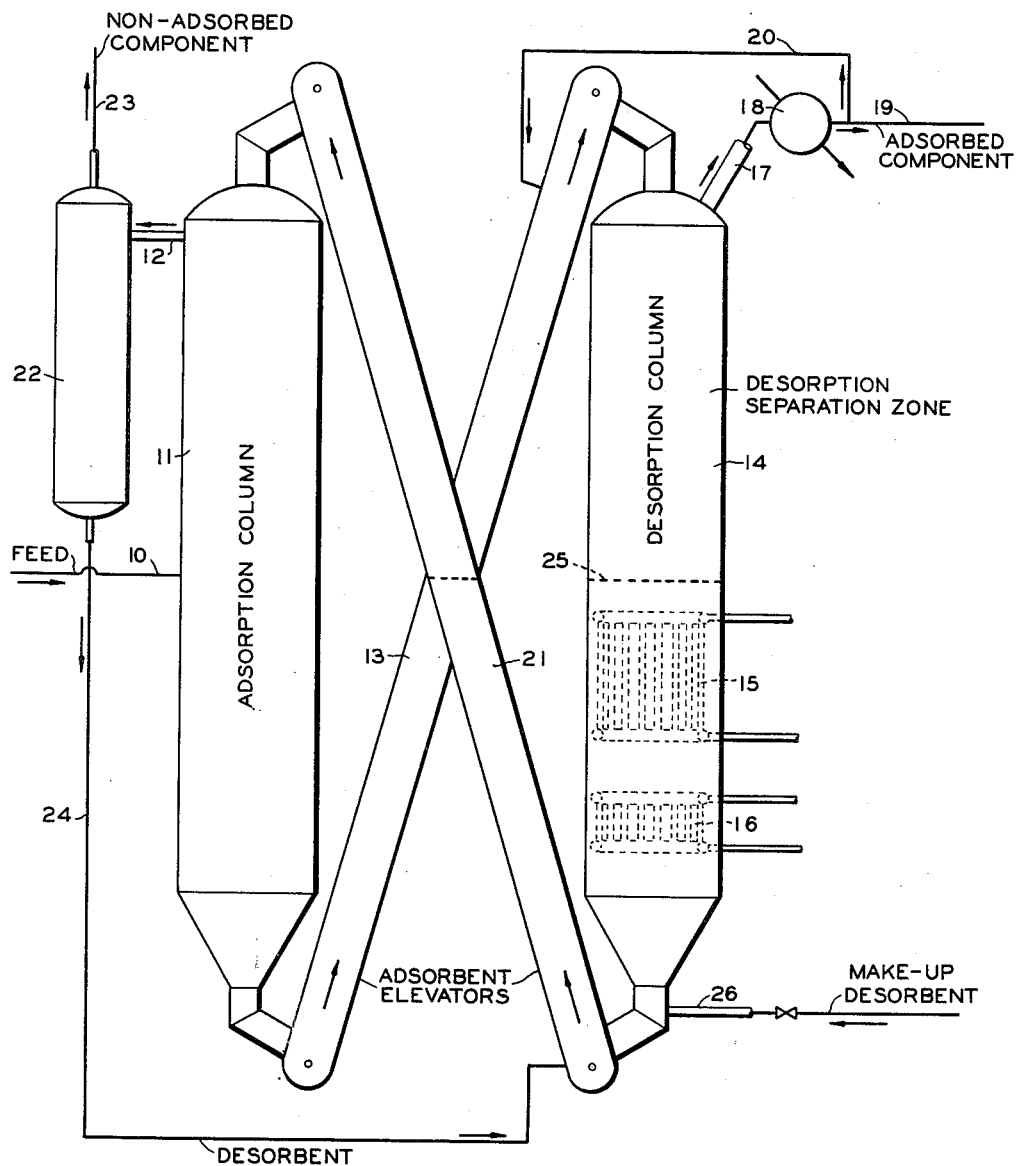
INVENTOR.
J. A. WEEDMAN
BY
ATTORNEYS Patented June 30, 1953

2,643,972

UNITED STATES PATENT OFFICE 2,643,972

CONTINUOUS ADSORPTION-DESORPTION PROCESS

John A. Weedman, Bartlesville, Okla., assignor to Phillips Petroleum Company, a corporation of Delaware Application April 2, 1951, Serial No. 218,787

11 Claims. (Cl. 196—147)

This invention relates to a continuous method for separating organic mixtures into constituents by selective adsorption. In one of its specific aspects the invention has particular reference to the desorption or adsorbent regeneration step in a continuous adsorption process wherein an adsorbed constituent is desorbed from the adsorbent by a desorbent liquid and separation of the thus desorbed constituent and the desorbent is simultaneously effected by fractional distillation in the desorption zone.

It has long been known to contact a liquid mixture of organic materials with solid adsorbents, usually silica gel or activated charcoal, although many other adsorbents such as activated alumina, bauxite, magnesia, etc. can be used, whereby the more readily adsorbed component or components are taken up by the solid and the less readily adsorbed component or components remain unadsorbed. In this manner a separation may be obtained between components of a two component mixture, or a complex mixture may be separated into two fractions of different characteristics according to adsorbability. By repeated treatment, three or more fractions of different character may be separated. Several methods of recovering the adsorbed material from the solid are available, including the use of a different liquid for which the solid adsorbent has less affinity than the organic material which it has adsorbed, the use of a different liquid for which the solid adsorbent has more affinity than the organic material which it has adsorbed, and removal of the adsorbed material by vaporization from the adsorbent. Thus, a hydrocarbon mixture containing paraffins and aromatics may be contacted in the liquid phase with silica gel under conditions at which the paraffins are unadsorbed and the aromatic material is adsorbed. The paraffinic material is physically separated as one product from the gel, and the latter is then treated by one of the methods mentioned to remove the aromatic material which is thus recovered as the other product.

Lately, this basic process which has long been used by batch procedures has been developed into a continuous process, in which the silica gel or other solid adsorbent, in the form of powder or small granules, is passed downwardly in "rod-like" flow in the form of a compact bed or columnar mass in contact with the hydrocarbon or other liquid material which is being treated. The liquid feed is introduced at an intermediate or low point in the column of gel, and the unadsorbed so-called raffinate is withdrawn from the top. The adsorbed material or so-called extract is separated from the gel by a number of methods, either in the same column or in a separate column; however, when recovery of extract is effected in the same column, the adsorbent is then passed to a separate column where it is conditioned for re-use in the process.

In the past, when separation of the adsorbed fraction from the solid adsorbent is effected by a desorbent liquid of either a greater or less affinity for the solid adsorbent than the organic material, it has adsorbed, it has been necessary to separate the desorbent liquid and desorbed fraction or adsorbate in a separate step in a separate fractional distillation column. By the practice of my invention, substantially complete separation of the desorbent liquid and desorbed fraction is accomplished in the desorption column, thereby eliminating the necessity of the separate fractionation step and the equipment necessary to accomplish that separation.

An object of this invention is to provide a continuous adsorption process for the separation of organic compounds.

Another object of this invention is to provide a continuous process for the separation of petroleum stocks into a plurality of fractions of differing characteristics.

Another object of this invention is to provide a continuous adsorption-desorption process for the separation of organic compounds wherein the desorption is effected by a liquid desorbent.

Another object of this invention is to provide a continuous adsorption-desorption process in which the desorption is accomplished in a separate column by a desorbent liquid of less affinity for the solid adsorbent than the material it has adsorbed with a simultaneous separation of the desorbent and adsorbed fraction in the desorption column.

Another object of this invention is to provide a continuous adsorption-desorption process wherein a solid adsorbent acts as a separating agent in two ways, i. e., as a selective adsorbent in the adsorption column and as packing for fractional distillation in the desorption column.

A further object of this invention is to provide a continuous adsorption-desorption process in which desorption is accomplished in a separate column by a desorbent liquid of less affinity for the solid adsorbent and of higher boiling point than the material the solid has adsorbed with simultaneous substantially complete separation of the desorbed material and the desorbent liquid in the desorption column.

Another object of this invention is to provide a continuous adsorption-desorption process for the separation of organic materials, the adsorption and desorption being carried out in separate columns, by use of a solid adsorbent and a liquid desorbent of less affinity for the solid adsorbent and of higher boiling point than the material the solid has adsorbed, wherein the solid adsorbent, while moving through the desorption column, acts as packing in a fractional distillation zone so as to effect a substantially complete separation of the desorbent liquid and the desorbed material in the desorption column.

Still another object of my invention is to provide a continuous adsorption-desorption process for the separation of organic materials wherein separation of a desorbed material and a desorbent liquid is accomplished in the adsorbent regeneration or desorption step, thereby eliminating the necessity of a separate fractional distillation column for the recovery of the desorbed material.

Further objects will be apparent to one skilled in the art from the accompanying disclosure and discussion.

In a preferred embodiment of my invention, particles of a solid adsorbent material aggregated into a columnar mass or bed are passed downwardly continuously as a moving bed in a vertical elongated adsorption zone, removed from the bottom thereof, passed to the top of a desorption zone and moved downwardly therethrough continuously as a moving mass or bed, removed from the bottom of the desorption zone and returned to the top of the adsorption zone to provide continuous operation. Into an intermediate point of the downwardly moving mass or bed in the adsorption zone is introduced a liquid (by liquid I mean liquid at the conditions of treatment although the material may be normally solid or normally gaseous, as well as normally liquid) organic material composed of at least two components of differing adsorbability. The more readily adsorbed component is adsorbed and carried downwardly by the solid adsorbent while the less readily adsorbed component passes upwardly in the zone and is withdrawn from the top thereof. The less readily adsorbed component is also referred to herein as the non-adsorbed or unadsorbed component. A column of a liquid desorbent, preferably of less affinity for the solid adsorbent and higher boiling than the adsorbed component, is maintained at an intermediate level in the desorption zone. I prefer to maintain an increasing temperature gradient from the bottom of the desorption zone to the surface of the desorbent liquid and a decreasing temperature gradient from the surface of the desorbent liquid to the top of the desorption zone such that the temperature in the bottom of the desorption zone is below the boiling point of the desorbent liquid and preferably at the temperature of the adsorption zone, the temperature at the surface of the desorbent is at or above the boiling point of the desorbent, and the temperature at the top of the desorption zone is lower than the boiling point of both the adsorbed component and the desorbent. It is desirable to maintain the temperature in upper portion of the desorption zone lower than the boiling point of both the adsorbed component and the desorbent so as to provide reflux of the desorbed adsorbed component in that portion of the desorption zone to provide conditions favorable for substantially complete separation of the desorbed component and the desorbent. When operating in this manner, rising vapors of the desorbed component contact the cool adsorbent and condense thereon thus vaporizing more of the adsorbed component. The condensed desorbed component then flows back down the desorption zone to provide reflux in the zone and the vaporized adsorbed component rises and contacts more cool adsorbent where the procedure is repeated. Thus substantially complete separation of adsorbed component and desorbent is accomplished. Of course the incoming adsorbent should not be so cold as to cause flooding of the upper part of the desorption zone. This temperature which will cause flooding will vary in each case and it is within the skill of the art to determine the temperature below which flooding will occur. Thus the temperature in the upper part of the desorption zone should be at or below the boiling point of the adsorbed component and above the flooding temperature at the conditions of operation. The desorbent vapors from the boiling desorbent rise in the desorption zone and contact the downwardly moving mass of solid adsorbent and thereby desorb the adsorbed component. The downwardly moving adsorbent, being below the boiling point of the desorbent, condenses the desorbent vapors and the condensed desorbent returns to the surface of the liquid desorbent column, thereby providing total reflux conditions in the desorption zone. The downwardly moving particles of solid adsorbent act as packing for fractional distillation which is thus going on in that portion of the desorption zone above the surface of the desorbent liquid, the distance from the top of the desorption zone to the surface of the liquid desorbent being chosen so as to allow substantially complete separation of desorbent and desorbed component by fractional distillation in that portion of the desorption zone. Vaporous desorbed component is withdrawn from the top of the desorption zone, the vapors being condensed and a portion of the condensed desorbed component being returned to the adsorbed component and solid adsorbent at a point intermediate the adsorption and desorption zones as reflux. Adsorbed and occluded desorbent contained in the solid adsorbent which is withdrawn from the bottom of the desorption zone and passed to the top of the adsorption zone is desorbed by the non-adsorbed component of the feed in the top of the adsorption zone and thus desorbed desorbent together with the non-adsorbed component of the feed is withdrawn from the top of the adsorption zone and passed to a fractional distillation column. The non-adsorbed component of the feed is withdrawn from one end of the fractional distillation column and desorbent is withdrawn from the other end thereof, the desorbent being returned to the bottom of the desorption zone so as to maintain the level of the liquid desorbent in that column. In some cases it may be desirable to maintain all or substantially all of the column of desorbent at its boiling point and to cool the adsorbent after it is withdrawn from the desorption zone. This cooling can be effected prior to introduction of the adsorbent into the adsorption zone or it can be effected in the adsorption zone.

My invention can be more clearly understood by referring to the accompanying drawing and description thereof which serves to illustrate one embodiment of my invention. The drawing is a schematic showing of apparatus and flow of materials therethrough suitable for practicing the invention as applied to the treatment of a feed material to separate same into two fractions, and is specifically described with reference to the removal and recovery of aromatic hydrocarbons such as benzene and toluene from a mixture of same in refinery or other hydrocarbon streams. The system is also particularly useful for the treatment of a cracked gas oil for the production of a high aniline point and a low aniline point product, as well as the various other types of separations described herein. Numerous auxiliary items of equipment such as valves, pumps, controls, and the like, are not shown in order to avoid confusion of the drawing, the supplying of such items being well within the skill of the art. It will be appreciated that various modifications can be made departing from the exact details of the system as shown in the drawing without departing from the invention.

In the drawing, a vertical elongated shell or column 11 is provided for carrying out the adsorption step of my process and a similar shell or column 14 is provided for carrying out the desorption step. A suitable adsorbent, for example silica gel, is introduced into the top of column 11 in the form of fine particles, e. g., particles of 3 to 10 mesh size, and an aggregated columnar mass or bed of the silica gel particles is maintained within column 11. This bed is allowed to move downwardly in rod-like flow by gravity. Gel is removed from the bottom of column 11 by suitable means as via elevator 13, and is passed to the top of column 14. Elevator 13 is ordinarily of the bucket-on-chain type, but other suitable means for lifting particles may be employed, for example liquid- or gas-lift. The fine particles of silica gel are maintained in an aggregated columnar mass or bed and allowed to move downwardly by gravity flow in column 14 similarly as in column 11. Gel is removed from the bottom of column 14 and passed to the top of column 11 by suitable means, for example by elevator 21, thus continuing the cyclic movement of the gel through the system. Elevator 21 is similar to elevator 13 and may also be replaced by other means for lifting particles, for example liquid- or gas-lift means.

The liquid to be separated into fractions, for example, a mixture of paraffinic and aromatic hydrocarbons comprising n-hexane and benzene, is introduced into column 11 via line 10 at an intermediate point in column 11. Gel flows downwardly in column 11 and liquid flows upwardly. In passing upward through the descending mass of silica gel, all or the major portion of the benzene or other aromatic content of the feed is adsorbed, the percentage adsorbed depending on various factors including the ratio of gel flow rate to aromatic flow rate, temperature of treatment, character of the various feed constituents, height of column, composition of the feed, and other factors as will be appreciated by one skilled in the art by virtue of the present disclosure. The paraffin-rich or non-adsorbed product is removed from the top of the column via line 12.

A column of a liquid desorbent, for example kerosene, of less affinity for the adsorbent than the adsorbed component of the feed and preferably higher boiling than the adsorbed component, is maintained in desorption column 14, the surface of the liquid desorbent being represented by number 25. An increasing temperature gradient is maintained from the bottom of column 14 to the surface of the liquid desorbent contained therein, the temperature in the bottom of column 14 being maintained at a value less than the boiling point of the liquid desorbent and preferably at the temperature being maintained in the adsorption column by means of adsorbent cooler 16, and the temperature at the surface 25 of the liquid desorbent being maintained at least as high as the boiling point of the desorbent by means of desorbent reboiler 15. Reboiler 15 and cooler 16 are of conventional design and are preferably positioned inside column 14 and allow free passage of the downwardly moving mass of gel in the column. A decreasing temperature gradient is maintained in the upper portion of column 14 from the surface 25 of the liquid desorbent to the top of the column, the temperature at the surface of the desorbent being at the boiling point of the desorbent as hereinbefore described, and the temperature at the top of column 14 being less than the boiling point of the desorbent and the adsorbed or aromatic component of the feed and preferably in the range being maintained in said adsorption column. It is apparent that a wide range of temperatures can be employed in the practice of my invention, the temperatures in each case depending upon the boiling points of the constituents of the mixture being separated and upon the desorbent being used. In general, the adsorption column and the desorption column are operated at different temperatures, with the desorption column being preferably operated at a higher temperature than the adsorption column. I also prefer to maintain the temperature in the top and bottom of the desorption column in the range of temperature being maintained in the adsorption column, and to maintain the temperature at the surface of the desorbent at the boiling point of the desorbent at the pressure obtaining therein. The vapors from the surface of the boiling desorbent rise in column 14 and contact the downwardly moving adsorbent thereby desorbing and vaporizing the adsorbed component. The adsorbent, being cooler than the vaporous desorbent and at a temperature below the boiling point of the desorbent, condenses the desorbent vapors thus liberating heat and the condensed desorbent returns to the surface 25 of the column of liquid desorbent to be revaporized. The downwardly moving particles of adsorbent, being aggregated into a columnar mass as hereinbefore explained, also act as packing in a fractional distillation zone in that portion of column 14 above surface 25 of the liquid desorbent so as to effect by rectification a substantially complete separation of the desorbed aromatic component and the desorbent, the desorbed aromatic component being withdrawn from the top of column 14 via line 17 as a vapor, and the desorbent returning to the surface 25 of the column of liquid desorbent as hereinbefore described. The vaporous desorbed aromatic component is condensed in condenser 18 and withdrawn therefrom as product via line 19, a portion of the product being returned as reflux to elevator 13 via line 20. Some can also be returned as reflux to the top of desorption column 14 if desired to aid the fractional distillation occurring therein.

The adsorbent which is withdrawn from the bottom of column 14 and passed to the top of column 11 via elevator 21 as previously described is wetted with desorbent. The adsorbent contacts the non-adsorbed component of the feed in the top of column 11 and the adsorbed desorbent is thereby desorbed and is withdrawn from column 11 via line 12 along with the non-adsorbed paraffinic component of the feed. Separation of the desorbent and the non-adsorbed component of the feed is effected in fractionating column 22, the non-adsorbed component being withdrawn from one end thereof via line 23, and the desorbent being withdrawn from the other end thereof and recycled to column 14 via line 24. Make-up desorbent, when such is needed, is introduced into desorption column 14 via line 26.

The process described provides a continuous adsorption-desorption process wherein desorption, and separation of the desorbed component and the desorbent, are simultaneously effected in the downwardly moving body of adsorbent particles in a desorption column, thereby eliminating the necessity of a separate separation step for recovery of the adsorbed product. In addition to permitting the use of a single column for the desorption and adsorbent regeneration operations in a continuous adsorption process, my invention accomplishes the following: (1) aromatics are stripped from the gel in the desorption column and the gel is thus reactivated in a form suitable for immediate reuse without further treatment, and (2) the solid adsorbent acts as a separating agent in two ways, i. e., as a selective adsorbent in the adsorption column, and as packing in a fractional distillation zone in the desorption column. The height of the separating and desorption zone in column 14 above the liquid desorbent level necessary to effect substantially complete separation of desorbent and desorbed component can be readily calculated in each individual case by known means. For example, the number of theoretical plates necessary to effect a separation of the desorbent and the desorbed component can be calculated by known means, and in the case of benzene and kerosene would be approximately 20 trays. Packing heights of from 1 to 6 inches have been found to be equivalent to one theoretical tray in the case of silica gel and similar packings. Thus the height of the desorption and separation zone in the desorption column necessary to obtain substantially complete separation will range from $20 \times 1 = 20$ inches to $20 \times 6 = 120$ inches, depending upon the diameter of the column. The desorption-separation space can be adjusted to the desired value by varying the height of the column of liquid desorbent by adding or withdrawing desorbent through line 26. It should be noted that the particle size of the adsorbent should be chosen such that a maximum efficiency is obtained in the adsorption column without causing flooding in the fractionation section of the desorption column. A particle size range of from 3 to 10 mesh has been found to give best results when carrying out an adsorption process according to my invention.

In view of the fact that the basic physical principles underlying adsorption are now well known to the art, a detailed consideration of same will not be given here. Those skilled in the art will readily understand that the exact conditions to be employed, including temperature and relative flow rates of adsorbent, feed, and desorbent, etc., will be greatly dependent on the particular feed stream which it is desired to separate, the degree of separation chosen, and the characteristics of the particular adsorbent used. Similarly, the residence time and temperature and hence the height of the desorption zone required for satisfactory desorption are dependent on the adsorbent, the character of the adsorbed material, and like factors. In this connection it should be noted that the minimum height of the desorption-separation zone in the desorption column necessary to accomplish both the desired desorption and separation operations may be determined by the space requirement necessary for either the desorption operation or the separation operation, whichever is greater, since the operation requiring the least space is not adversely affected by the extra space required to accomplish the other operation.

The process described may be applied to a wide variety of feed stocks. In addition to the types mentioned specifically hereinabove, wide boiling range gasolines may be treated to effect separation of hydrocarbons merely by type rather than by individual chemical components, virgin or cracked gas oils may be treated to separate same into a highly aromatic extract suitable for feed in making furnace type carbon black such as "Philblack" and a highly paraffinic raffinate suitable for catalytic cracking or use as a diesel fuel, kerosene or other naphtha fractions may be treated to remove aromatics and sulfur compounds therefrom. Narrow boiling aromatic-paraffinic or olefinic-paraffinic cuts may be fractionated by adsorption to produce pure aromatic, paraffinic and olefinic compounds. It will be noted that this adsorption fractionation process is adapted to any desired degree of separation. Thus it may be used to produce one or more relatively pure compounds or it may be used merely to concentrate further a desired compound in its original mixture. It will be appreciated that the mixture of non-adsorbed component and desorbent withdrawn from the top of the adsorption column may be used as a mixture, making separation of these compounds unnecessary. In such a case make-up desorbent is added in order to maintain the level of the desorbent in the desorption column. Likewise the desorbed product which is withdrawn from the top of the desorption column may be used in other operations in its vapor state, making condensation of the product unnecessary. Thus it is apparent that changes in the exact details of the process I have described as illustrating my invention can be made without departing from the spirit and scope of the invention.

Numerous non-hydrocarbons and particularly non-hydrocarbon organic liquid mixtures can be subjected to the adsorption process of my invention to separate same into group or individual constituents. The separation of normally solid or normally gaseous organic compounds is within the scope of this invention since they may be changed to liquids by appropriate coordination of two normal process variables, namely, temperature and pressure. For example, this process is readily adaptable to the separation of a normally gaseous butene-butadiene liquid mixture by slightly increasing operating pressures. Similarly it is within the scope of this process to purify a normally solid naphthalene stock by conducting the adsorption process at a moderately elevated temperature. With respect to hydrocarbon types in general, polynuclear aromatics are most readily adsorbed, mononuclear aromatics next, and continuing in accordance with decreasing adsorbability are the cyclic olefins, open-chain olefins, naphthenes, and paraffins. Ketones are more readily adsorbed than hydrocarbons, alcohols more than ketones, and water more than alcohols. The relative adsorbabilities of other liquids are already known to the art, or may readily be determined by trial.

It has been pointed out hereinabove that I prefer to utilize a desorbent liquid of less affinity for the solid adsorbent than the material it has adsorbed and of a higher boiling point than the adsorbed material. It is also desirable to select a desorbent having a boiling point sufficiently different from the boiling point of the non-adsorbed component of the feed such that separation of those materials may be readily accomplished by fractionation when it is desired to recycle desorbent rather than utilizing the mixture of desorbent and non-adsorbed component as such. Other factors to be considered in selecting a desorbent include convenience and economics, taking into consideration effectiveness for desorbing a particular extract, cost, effect on adsorbent, and ease of removal from the adsorbent.

*Example*

1500 pounds per hour of about 8 mesh silica gel is moved as a compact mass downwardly through an adsorption column, elevated to the top of a desorption column and moved as a compact mass downwardly therethrough, and elevated to the top of the adsorption column, thus providing continuous circulation of the adsorbent through the system. The adsorption and desorption columns are of the same size, each having a length of 20 feet and an inside diameter of two feet. 1000 gallons per hour of a liquid feed comprising 95 per cent n-hexane and 5 per cent benzene is introduced into the adsorption column at a point 10 feet from the top. Atmospheric pressure is maintained in both the adsorption column and the desorption column. The temperature in the adsorption column is maintained in the range of 70° to 80° F. A 10 foot column of a liquid highly paraffinic kerosene having a boiling point of from 275° to 300° F. is maintained in the desorption column, thereby providing a 10 foot separation and desorption zone in the upper portion of the desorption column. A temperature as near as possible to 70° to 80° F. is maintained in the bottom of the desorption column, a temperature of from 275° to 300° F. is maintained at the surface of the desorbent, and a temperature of from 70° to 80° F. is maintained in the top of the desorption zone. 150 gallons per hour of benzene in vapor form is withdrawn from the top of the desorption column and the vapors condensed. 100 gallons per hour of the condensed benzene is recycled to the elevator connecting the top of the desorption column with the bottom of the adsorption column to provide a reflux in the adsorption system. 50 gallons per hour of the condensed benzene is withdrawn as product. 1100 gallons per hour of a mixture of n-hexane and kerosene is withdrawn from the top of the adsorption column and the mixture separated in a fractionating column. 950 gallons per hour of n-hexane is withdrawn from the top of the fractionator and 150 gallons per hour of kerosene is recycled to the bottom of the desorption column.

I claim:

1. A process for continuously separating a mixture of organic compounds capable of being selectively adsorbed by contact in the liquid phase with a solid adsorbent, which comprises, continuously moving particles of a solid adsorbent aggregated into a columnar mass downwardly by gravity flow through an adsorption zone, said particles of solid adsorbent being in a size range of from 3 to 10 mesh, continually feeding said mixture of organic compounds in the liquid phase at an intermediate point into said adsorption zone into contact with the moving particles of adsorbent, continually withdrawing a liquid non-adsorbed component of said mixture from the upper end of said adsorption zone, continually withdrawing said particles of solid adsorbent together with an adsorbed component of said mixture of organic compounds from the bottom of said adsorption zone and passing same to the upper end of a desorption zone, continually moving said particles of solid adsorbent aggregated into a columnar mass downwardly by gravity flow through said desorption zone, maintaining a column of a liquid desorbent in the lower portion of said desorption zone, said liquid desorbent being less strongly adsorbed by said solid adsorbent than said adsorbed component and having a boiling point greater than said adsorbed component, maintaining a decreasing temperature gradient from the surface of said liquid desorbent to the top of said desorption zone, the temperature in the top of said desorption zone being lower than the boiling point of said desorbent and said adsorbed component, the temperature at the surface of said liquid desorbent being at least as great as the boiling point of the desorbent so as to cause desorbent vapors to rise in said desorption zone and contact said downwardly moving particles of solid adsorbent thereby desorbing and vaporizing said adsorbed component and condensing said desorbent vapors, separating said desorbed component and said desorbent in that portion of said desorption zone above said column of liquid desorbent by utilizing the particles of solid adsorbent contained therein as packing in a fractional distillation zone, returning said condensed desorbent to the surface of said liquid desorbent, continually withdrawing separated vaporous desorbed component from the top of said desorption zone, continually withdrawing particles of solid adsorbent together with adsorbed desorbent from the bottom of said desorption zone and passing same to the top of said adsorption zone into contact with said liquid non-adsorbed component so as to desorb said desorbent, continually withdrawing said desorbent from the top of said adsorption zone along with said non-adsorbed component.

2. A process for continuously separating a mixture of organic compounds capable of being selectively adsorbed by contact in the liquid phase with a solid adsorbent, which comprises, continuously moving particles of a solid adsorbent aggregated into a columnar mass downwardly by gravity flow through an adsorption zone, said particles of solid adsorbent being in a size range of from 3 to 10 mesh, continually feeding said mixture of organic compounds in the liquid phase at an intermediate point into said adsorption zone into contact with the moving particles of adsorbent, continually withdrawing a liquid non-adsorbed component of said mixture from the upper end of said adsorption zone and passing same to a fractionating column, continually withdrawing said particles of solid adsorbent together with an adsorbed component of said mixture of organic compounds from the bottom of said adsorption zone and passing same to the upper end of a desorption zone, continually moving said particles of solid adsorbent aggregated into a columnar mass downwardly by gravity flow through said desorption zone, maintaining a column of a liquid desorbent in the lower portion of said desorption zone, said liquid desorbent being less strongly adsorbed by said solid adsorbent than said adsorbed component and having a boiling point greater than said adsorbed component, maintaining an increasing temperature gradient from the bottom of said desorption zone to the surface of said column of liquid desorbent and a decreasing temperature gradient from the surface of said liquid desorbent to the top of said desorption zone, the temperature in the bottom of said desorption zone being below the boiling point of said liquid desorbent, the temperature in the top of said desorption zone being lower than the boiling point of said desorbent and said adsorbed component, the temperature at the surface of said liquid desorbent being at least as great as the boiling point of the desorbent so as to cause desorbent vapors to rise in said desorption zone and contact said downwardly moving particles of solid adsorbent thereby desorbing and vaporizing said adsorbed component and condensing said desorbent vapors, separating said desorbed component and said desorbent in that portion of said desorption zone above said column of liquid desorbent by utilizing the particles of solid adsorbent contained therein as packing in a fractional distillation zone, returning said condensed desorbent to the surface of said liquid desorbent, continually withdrawing separated vaporous desorbed component from the top of said desorption zone, continually withdrawing particles of solid adsorbent together with adsorbed desorbent from the bottom of said desorption zone and passing same to the top of said adsorption zone into contact with said liquid non-adsorbed component so as to desorb said desorbent, continually withdrawing said desorbent from the top of said adsorption zone along with said non-adsorbed component and passing same to said fractionating column, separating said non-adsorbed component and said desorbed desorbent in said fractionating column, withdrawing non-adsorbed component from one end of said fractionating column, and withdrawing desorbent from the other end thereof and recycling same to the bottom of said desorption zone.

3. A process for continuously separating a mixture of organic compounds capable of being selectively adsorbed by contact in the liquid phase with a solid adsorbent, which comprises, continuously moving particles of a solid adsorbent aggregated into a columnar mass downwardly by gravity flow through an adsorption zone, said particles of solid adsorbent being in a size range of from 3 to 10 mesh, continually feeding said mixture of organic compounds in the liquid phase at an intermediate point into said adsorption zone into contact with the moving particles of adsorbent, continually withdrawing a liquid non-adsorbed component of said mixture from the upper end of said adsorption zone, continually withdrawing said particles of solid adsorbent together with an adsorbed component of said mixture of organic compounds from the bottom of said adsorption zone and passing same to the upper end of a desorption zone, continually moving said particles of solid adsorbent aggregated into a columnar mass downwardly by gravity flow through said desorption zone, maintaining a column of a liquid desorbent in the lower portion of said desorption zone, said liquid desorbent being less strongly adsorbed by said solid adsorbent than said adsorbed component and having a boiling point greater than said adsorbed component, maintaining an increasing temperature gradient from the bottom of said desorption zone to the surface of said column of liquid desorbent and a decreasing temperature gradient from the surface of said liquid desorbent to the top of said desorption zone, the temperature in the bottom of said desorption zone being below the boiling point of said liquid desorbent, the temperature in the top of said desorption zone being lower than the boiling point of said desorbent and said adsorbed component, the temperature at the surface of said liquid desorbent being at least as great as the boiling point of the desorbent so as to cause desorbent vapors to rise in said desorption zone and contact said downwardly moving particles of solid adsorbent thereby desorbing and vaporizing said adsorbed component and condensing said desorbent vapors, separating said desorbed component and said desorbent in that portion of said desorption zone above said column of liquid desorbent by utilizing the particles of solid adsorbent contained therein as packing in a fractional distillation zone, returning said condensed desorbent to the surface of said liquid desorbent, continually withdrawing separated vaporous desorbed component from the top of said desorption zone and condensing same, recycling a portion of the condensed desorbed component to said solid adsorbent and adsorbed component at a point intermediate said adsorption zone and said desorption zone, continually withdrawing particles of solid adsorbent together with adsorbed desorbent from the bottom of said desorption zone and passing same to the top of said adsorption zone into contact with said liquid non-adsorbed component so as to desorb said desorbent, continually withdrawing said desorbent from the top of said adsorption zone along with said non-adsorbed component.

4. A process for continuously separating a mixture of organic compounds capable of being selectively adsorbed by contact in the liquid phase with a solid adsorbent, which comprises, continuously moving particles of a solid adsorbent aggregated into a columnar mass downwardly by gravity flow through an adsorption zone, said particles of solid adsorbent being in a size range of from 3 to 10 mesh, continually feeding said mixture of organic compounds in the liquid phase at an intermediate point into said adsorption zone into contact with the moving particles of adsorbent, continually withdrawing a liquid non-adsorbed component of said mixture from the upper end of said adsorption zone and passing same to a fractionating column, continually withdrawing said particles of solid adsorbent together with an adsorbed component of said mixture of organic compounds from the bottom of said adsorption zone and passing same to the upper end of a desorption zone, continually moving said particles of solid adsorbent aggregated into a columnar mass downwardly by gravity flow through said desorption zone, maintaining a column of a liquid desorbent in the lower portion of said desorption zone, said liquid desorbent being less strongly adsorbed by said solid adsorbent than said adsorbed component and having a boiling point greater than said adsorbed component, maintaining an increasing temperature gradient from the bottom of said desorption zone to the surface of said column of liquid desorbent and a decreasing temperature gradient from the surface of said liquid desorbent to the top of said desorption zone, the temperature in the bottom of said desorption zone being below the boiling point of said liquid desorbent, the temperature in the upper part of said desorption zone being lower than the boiling point of said desorbent and said adsorbed component, the temperature at the surface of said liquid desorbent being at least as great as the boiling point of the desorbent so as to cause desorbent vapors to rise in said desorption column and contact said downwardly moving particles of solid adsorbent thereby desorbing and vaporizing said adsorbed component and condensing said desorbent vapors, separating said desorbed component and said desorbent in that portion of said desorption zone above said column of liquid desorbent by utilizing the particles of solid adsorbent contained therein as packing in a fractional distillation zone, returning said condensed desorbent to the surface of said liquid desorbent, continually withdrawing separated vaporous desorbed component from the top of said desorption zone and condensing same, recycling a portion of the condensed desorbed component to said solid adsorbent and adsorbed component at a point intermediate said adsorption zone and said desorption zone, continually withdrawing particles of solid adsorbent together with adsorbed desorbent from the bottom of said desorption zone and passing same to the top of said adsorption zone into contact with said liquid non-adsorbed component so as to desorb said desorbent, continually withdrawing said desorbent from the top of said adsorption zone along with said non-adsorbed component and passing same to said fractionating column, separating said non-adsorbed component and said desorbed desorbent in said fractionating column, withdrawing non-adsorbed component from one end of said fractionating column, and withdrawing desorbent from the other end thereof and recycling same to the bottom of said desorption zone.

5. A process according to claim 4 wherein said organic compounds comprise benzene and n-hexane, and said adsorbent is silica gel.

6. A process according to claim 5 wherein said liquid desorbent is a kerosene having a boiling point in the range of 275° to 300° F.

7. A process according to claim 6 wherein the temperature at the bottom of said desorption zone is in the range of 70° to 80° F., the temperature at the surface of said kerosene is in the range of 275° to 300° F., and the temperature in the top of said desorption zone is in the range of 70° to 80° F.

8. A process according to claim 4 wherein said adsorbent is silica gel.

9. A process according to claim 4 wherein said adsorbent is activated charcoal.

10. A process according to claim 4 wherein said organic compounds comprise aromatic and non-aromatic hydrocarbons.

11. A process according to claim 4 wherein said organic compounds comprise a gas oil containing aromatic and non-aromatic constituents, and said desorbent is an essentially aromatic-free kerosene.

JOHN A. WEEDMAN.

References Cited in the file of this patent

UNITED STATES PATENTS

| Number | Name | Date |
|--------|------|------|
| 2,395,491 | Mavity | Feb. 26, 1946 |
| 2,470,339 | Claussen et al. | May 17, 1949 |
| 2,566,613 | Hepp | Sept. 4, 1951 |
| 2,582,415 | Claussen | Jan. 15, 1952 |